United States Patent [19]

Grabowski et al.

[11] 4,408,342
[45] Oct. 4, 1983

[54] METHOD FOR RECOGNIZING A MACHINE ENCODED CHARACTER

[75] Inventors: John S. Grabowski, Kitchener, Canada; Chin-Chih Shiau, Chelmsford, Mass.; John R. Latala, Waterloo, Canada

[73] Assignee: NCR Corporation, Dayton, Ohio

[21] Appl. No.: 254,838

[22] Filed: Apr. 16, 1981

[51] Int. Cl.³ .............................................. G06K 9/34
[52] U.S. Cl. ........................................ 382/9; 382/34; 382/48; 382/57; 382/62
[58] Field of Search ............... 340/146.3 SG, 146.3 H, 340/146.3 AH, 146.3 WD, 146.3 ED, 146.3 MA; 382/7, 9, 34, 48, 57, 59, 62; 358/280, 282, 288

[56] References Cited

U.S. PATENT DOCUMENTS

| | | | |
|---|---|---|---|
| 3,199,080 | 8/1965 | Rabinow et al. | 382/57 |
| 3,295,105 | 12/1966 | Gray et al. | 340/146.3 H |
| 3,618,016 | 11/1971 | Van Steenis | 382/30 |
| 3,710,323 | 1/1973 | Andrews et al. | 340/146.3 H |
| 4,045,773 | 8/1977 | Kadota et al. | 340/146.3 SG |
| 4,048,617 | 9/1977 | Neff | 382/59 |
| 4,110,737 | 8/1978 | Fahey | 382/30 |
| 4,122,443 | 10/1978 | Thaler et al. | 340/146.3 H |
| 4,173,015 | 10/1979 | Owens et al. | 340/146.3 SG |
| 4,204,193 | 5/1980 | Schroeder | 340/146.3 H |
| 4,206,442 | 6/1980 | Miyazaki et al. | 340/146.3 SG |
| 4,295,121 | 10/1981 | Enser et al. | 340/146.3 SG |
| 4,377,803 | 3/1983 | Lotspiech et al. | 382/9 |

OTHER PUBLICATIONS

Baumgartner, "Iterative Segmentation", *IBM Tech. Dis. Bulletin*, vol. 14, No. 9, Feb. 1972, pp. 2643-2644.
Tenpas, "Character Isolation for Recognition Machines," *IBM Tech. Disc. Bulletin*, vol. 19, No. 1, Jun. 1976, pp. 271-272.

*Primary Examiner*—Leo H. Boudreau
*Attorney, Agent, or Firm*—J. T. Cavender; Edward Dugas; Arthur A. Sapelli

[57] ABSTRACT

An optical character recognition system and method therefor is disclosed for reading a machine encoded character font, such as the E13B magnetic ink character (MICR) font. The digitized data of an optical scan band of the document to be read is read by an optical scanner and stored in memory. A two pass operation of the digitized data is then performed by the respective algorithms of the system to locate and recognize the characters read.

14 Claims, 10 Drawing Figures

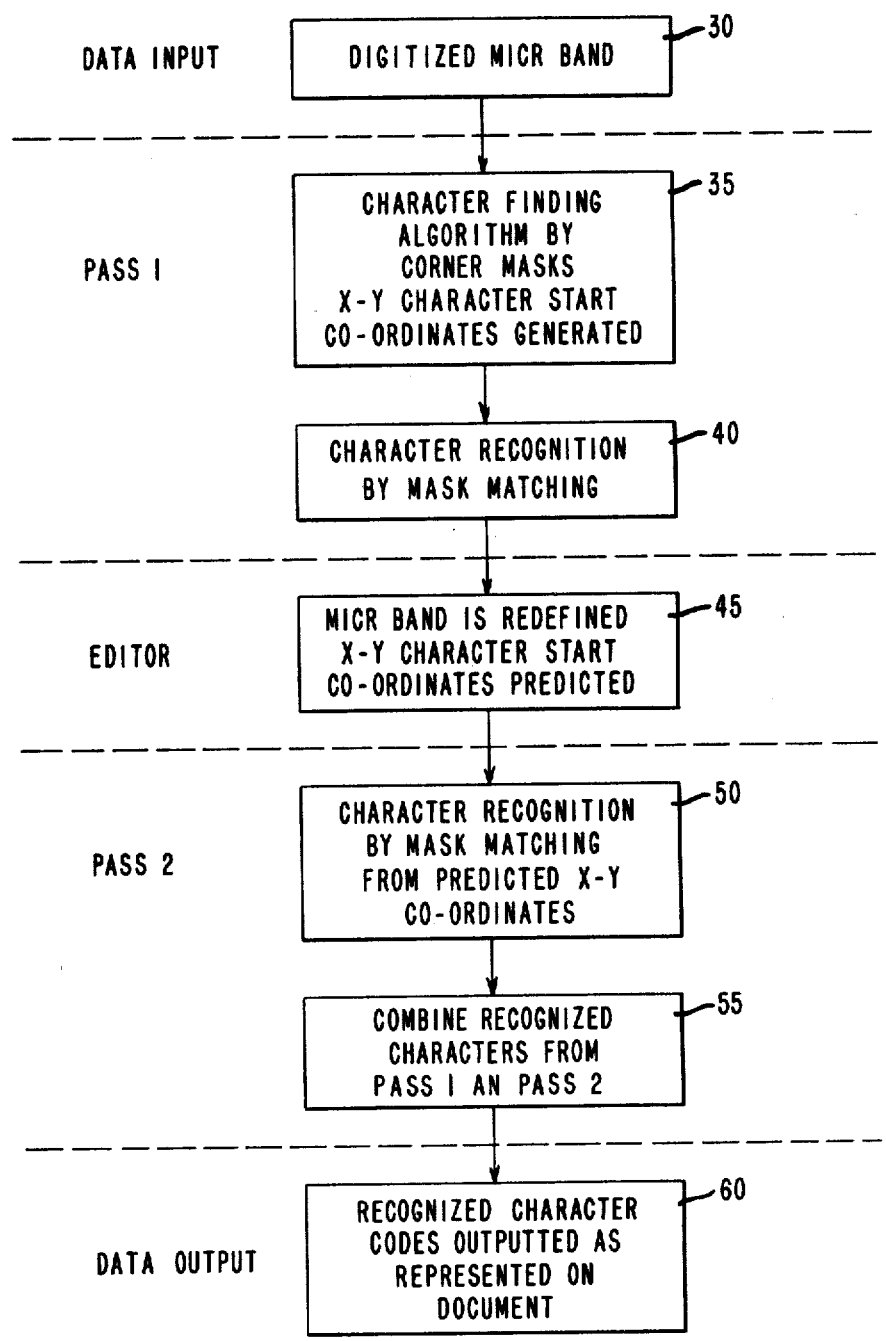

|  | Y | X |
|---|---|---|
| 1) | 36 | 14 |
| 2) | 37 | 33 |
| 3) | 34 | 52 |
| 4) | 38 | 73 |
| 5) | 36 | 91 |
| 6) | 37 | 109 |
| 7) | 18 | 116 |
| 8) | 36 | 128 |
| 9) | 37 | 147 |
| 10) | 36 | 242 |
| 11) | 35 | 261 |
| 12) | 36 | 299 |

FIG. 3

|  | Y | X |
|---|---|---|
| 1 | 36 | 14 |
| 2 | 37 | 33 |
| 3 | 34 | 52 |
| 4 | 38 | 73 |
| 5 | 36 | 91 |
| 6 | 37 | 109 |
| 7 | ELIMINATED-CO-ORDINATE OUT OF BOUNDS | |
| 8 | 36 | 128 |
| 9 | 37 | 147 |
| 9a | 36 | 166 ← |
| 9b | 36 | 185 ← |
| 9c | 36 | 204 ← |
| 9d | 36 | 223 ← |
| 10 | 36 | 242 |
| 11 | 35 | 261 |
| 11a | 36 | 280 ← |
| 12 | 36 | 299 |
| 12a | 36 | 318 ← |
| 12b | 36 | 337 ← |

FIG. 4

PREDICTED X-Y CHARACTER START CO-ORDINATES

FIG. 10

CHARACTER MASKS (TEMPLATES)

| SHIFT POSITION | 0 | 1 | 2 | 3 | 4 | 5 | 6 | 7 | 8 | 9 | TR | AM | ON | DA |
|---|---|---|---|---|---|---|---|---|---|---|---|---|---|---|
| 1 | (2) | 52 | 46 | 56 | 55 | 56 | 39 | 39 | 34 | 49 | 46 | 53 | 55 | 46 |
| 2 | 6 | 51 | 55 | (44) | 54 | 63 | 40 | 42 | (30) | 46 | 44 | 55 | 61 | 55 |
| 3 | 8 | (42) | 56 | 63 | 63 | 71 | 41 | 52 | 36 | 51 | 50 | 57 | 64 | 58 |
| 4 | 5 | 50 | (41) | 62 | 71 | 72 | 52 | 61 | 36 | 53 | 56 | 61 | 71 | 62 |
| 5 | 10 | 46 | 61 | 69 | 75 | 69 | (38) | (34) | 38 | 62 | (39) | 63 | 56 | 61 |
| 6 | 11 | 51 | 59 | 71 | (51) | 55 | 56 | 50 | 44 | (40) | 43 | 58 | 70 | 58 |
| 7 | 12 | 60 | 63 | 73 | 56 | (46) | 61 | 49 | 98 | 61 | 55 | (47) | 64 | (44) |
| 8 | 14 | 43 | 58 | 70 | 57 | 48 | 57 | 47 | 50 | 58 | 61 | 49 | (48) | 54 |
| 9 | 16 | 44 | 60 | 65 | 62 | 51 | 55 | 44 | 51 | 54 | 64 | 52 | 51 | 46 |

| | | | | | | | | | | | | | | |
|---|---|---|---|---|---|---|---|---|---|---|---|---|---|---|
| | 2 | 42 | 41 | 44 | 51 | 46 | 38 | 34 | 30 | 40 | 39 | 47 | 48 | 44 |

↑ MIN        ↑ NEXT MIN

METHOD FOR RECOGNIZING A MACHINE ENCODED CHARACTER

BACKGROUND OF THE INVENTION

This invention relates to a method for recognizing a machine encoded character font and more particularly to an accurate character finding and recognition algorithm for a more reliable optical character recognition method.

For documents which can frequently be found to have within a scan band, backgrounds, teller bank stamps, or customer signatures, optical character recognition of a machine encoded character font is difficult. When no optical clear band exists, backgrounds, signatures, etc. can be interpreted as characters thereby leading to rejected, misread (substituted), or extra (a blank location interpreted as data) characters.

Optical character recognition of a machine encoded character font, such as the E13B Magnetic Ink Character Recognition (MICR) font, is a difficult process as no optical standard exists for this font because the E13B characters were originally designed for magnetic reading and recognition. Because of the lack of an Optical Character Recognition (OCR) standard, foreign signals such as customers' signatures, bank teller stamps, scenic check backgrounds, etc., can be overlayed on top of the E13B MICR characters. These foreign signals will also be lifted optically together with the E13B MICR characters resulting in increased character rejects and misreads. Precise location of the E13B MICR characters within the scan band is a difficult but very important task for any optical character recognition scheme. Characters not precisely located can be rejected or misread due to the increased background noise of the optical E13B scan band.

Previous optical character recognition methods utilize a single pass character location and recognition approach. This has the disadvantage in that any MICR character would have to be precisely located by a fairly sophisticated and accurate character finding and recognition algorithm. The present invention is an optical character recognition technique devised to recognize E13B font MICR characters. The optical character recognition technique of the present invention utilizes a two pass operation wherein the MICR scan band image is processed two times. The two passes utilized by the present invention for the optical location and recognition of the E13B font character results in a reliable recognition of the E13B characters in an optically contaminated scan band.

SUMMARY OF THE INVENTION

In accordance with the present invention a new optical character recognition technique has been devised. The present invention utilizes a method for optically reading and determining machine encoded characters from a printed document. The method comprises the steps of scanning an area of the printed document to be read, outputting digitized data and storing the digitized data. The digitized data is analyzed for ascertaining the existence of determinable characters and an associated starting location for each determinable character, the starting locations being stored in a location table. The machine encoded character for each starting location stored in the location table is then determined. The location table is edited for predicting the probable starting locations of additional characters, including blanks, and the additional characters are determined based upon the predicted location.

From the foregoing it can be seen that it is a primary object of the present invention to provide an optical character recognition method for determining a machine-encoded character font.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 2 is a functional flow diagram of the optical character recognition system of the present invention;

FIG. 3 shows a sample X—Y coordinate table which might be generated by the character finding algorithm of the present invention;

FIG. 4 is a version of the X—Y coordinate table of FIG. 3 after the editing function of the present invention has been performed;

FIG. 10 depicts an example of the character recognition process of the present invention.

DETAILED DESCRIPTION

Figure 1:
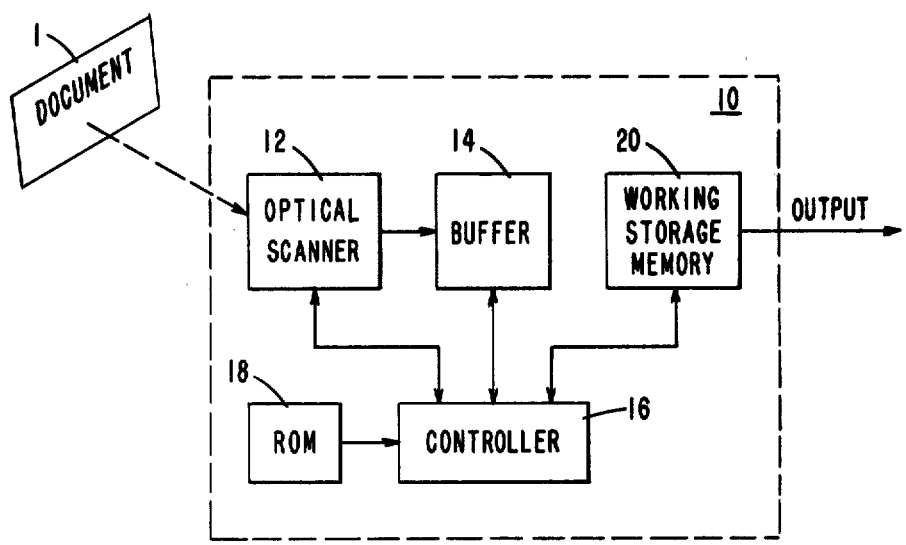
FIG. 1 shows a block diagram of an optical character recognition system.

The optical character recognition system 10, herein referred to as the system 10, is shown in FIG. 1. The system 10 comprises an optical scanner 12 which is coupled to a buffer 14, the optical scanner 12 being under the control of a controller 16. The buffer 14, at least sufficiently large to store the digitized data of an entire optical scan area of the document 1 to be read having a machine-encoded character font within the optical scan area, is also coupled to controller 16. The controller 16 is further coupled to a ROM 18 which stores the control firmware, masks, algorithms, etc., and to a working storage memory 20 for storing the digitized data of a character matrix utilized by the algorithms for determining the characters and for storing intermediate and final results. The output of the working storage memory 20 forms the output of the system 10, the results in working storage memory 20 containing a digital representation indicative of the characters read from the document. Controller 16 contains the registers, control circuitry, and arithmetic and logic unit as required to perform the steps required by the character finding and character recognition algorithms. Controller 16 may be a CPU or microprocessor known in the art and is not discussed further herein.

An overview of the entire character recognition operation will now be described in conjunction with FIGS. 1 and 2. The document 1 containing the characters to be read is introduced into the system 10 via some document transport mechanism (not shown) which places the document 1 in a position to be read by the optical scanner 12. Fundamentally, any type optical scanner 12 well known in the art can be used in which the output data from the optical scanner 12 may be serially fed column-wide into a register. In the preferred embodiment, the system 10 is designed to process an E13B MICR optical scan band of 96-bits high and 1348-bits wide based on a scanning resolution of 154 pixels per inch (i.e., a scan band about ⅝ of an inch high and 8.75 inches long). The digitized data for the entire scan band of document 1 is stored in buffer 14 comprising the data input step (block 30).

After all the data has been inputted, the character finder algorithm is initiated (block 35). The E13B optical scan band data stored in buffer 14 is passed through the character finding algorithm. An X—Y character start location is determined, and stored in working storage memory 20 with each potential E13B character found. Assuming the scan band is scanned from top to bottom, with successive scanning lines moving from right to left, the starting location becomes the character start position of the top right hand corner of the potential character that was located. When a potential E13B character has been located, the character recognition of the potential character is initiated (block 40). The character recognition takes place by obtaining a data block 16 pixels wide by 20 pixels high from the X—Y character start coordinate generated from the above step. The character start position is designated as the top right-hand corner of the located character. The coordinates of the block become (X, X+15), (Y, Y+19). This data block is now used for the character recognition process, discussed in detail hereinunder. Blocks 35 and 40 comprise Pass 1.

An editing function (block 45) is then performed by taking the X—Y coordinates and more accurately defining the E13B MICR band. This is done by taking the Y coordinates, determining the most frequent Y value (Y1) of all of the starting locations in Pass 1 and then eliminating any coordinates whose values do not fall into the range Y1±D (block 45). The value of D is determined by taking into consideration the amount of document skew that will be found in the transport mechanism, as well as variations in the printing of the E13B characters (notably, the vertical misalignment). The preferred embodiment utilizing D has the value of eight (8). By way of illustrating the editing function, reference is made to FIGS. 3 and 4. FIG. 3 is a sample of an X—Y coordinate table which might be generated by the character finding algorithm. In the example set forth in FIG. 3, the most frequently occurring Y coordinate of the twelve starting locations listed there is 36. Thus the range of allowable Y values lies between 28 and 44, thereby eliminating coordinate 7. This character was a misread (a noisy document background image being mistaken as an E13B MICR character). By analyzing the X—Y coordinates remaining in FIG. 3 with regards to character pitch, line skew, etc., it is apparent that there is no progressive change in the Y values and therefore no skew of the document relative to its line of travel. The most common difference between successive X values is 19, but there is a distance of 5×19 between the X coordinates of locations 9 and 10 and a distance of 2×19 between locations 11 and 12. Using this information, the editing function then predicts where additional E13B characters can be located by assigning X—Y character start coordinates to gaps in the buffer table. FIG. 4, the complete edited version of the X—Y coordinate table of FIG. 3, shows gaps between coordinates 9 and 10, between 11 and 12, and after 12. (In this example the X boundary ends at coordinate X=360.)

It will be recognized by those skilled in the art that the editing function may be achieved in a variety of ways. For example, the editing function can be done on a document basis, or the document may be segmented into fields with the X—Y coordinates associated within each field treated separately. Treating the document by segments has advantages when the E13B characters are printed at different times, as is true when a check has the amount entered on it by a bank at the time the check is cashed. This approach can compensate for any differences in the vertical positions between the fields printed at different times.

Referring back to FIG. 2, Pass 2 then takes each of the predicted X—Y character start locations generated by the edit step, obtains a 16×20 data block from buffer 14, and performs character recognition to determine the MICR character or "blank" condition (block 50). The character recognition algorithm will be described in detail hereinunder. The controller 16 then performs a second editing function combining the recognized characters from Pass 1 and Pass 2 in the sequence in which they appear on the document image (block 55). The output data, which is the digital representation of the characters read from the document, is then outputted (block 60) or made available to a subsequent processor or user. Thus, the two pass character recognition technique needs only a fairly simple character finding algorithm, since in Pass 1, character finding is based on locating relatively easily recognizable characters. In Pass 2, no time need be wasted looking at areas of the scan band where no E13B characters were initially found since the X—Y coordinates of the characters have already been accurately predicted.

Figure 5:
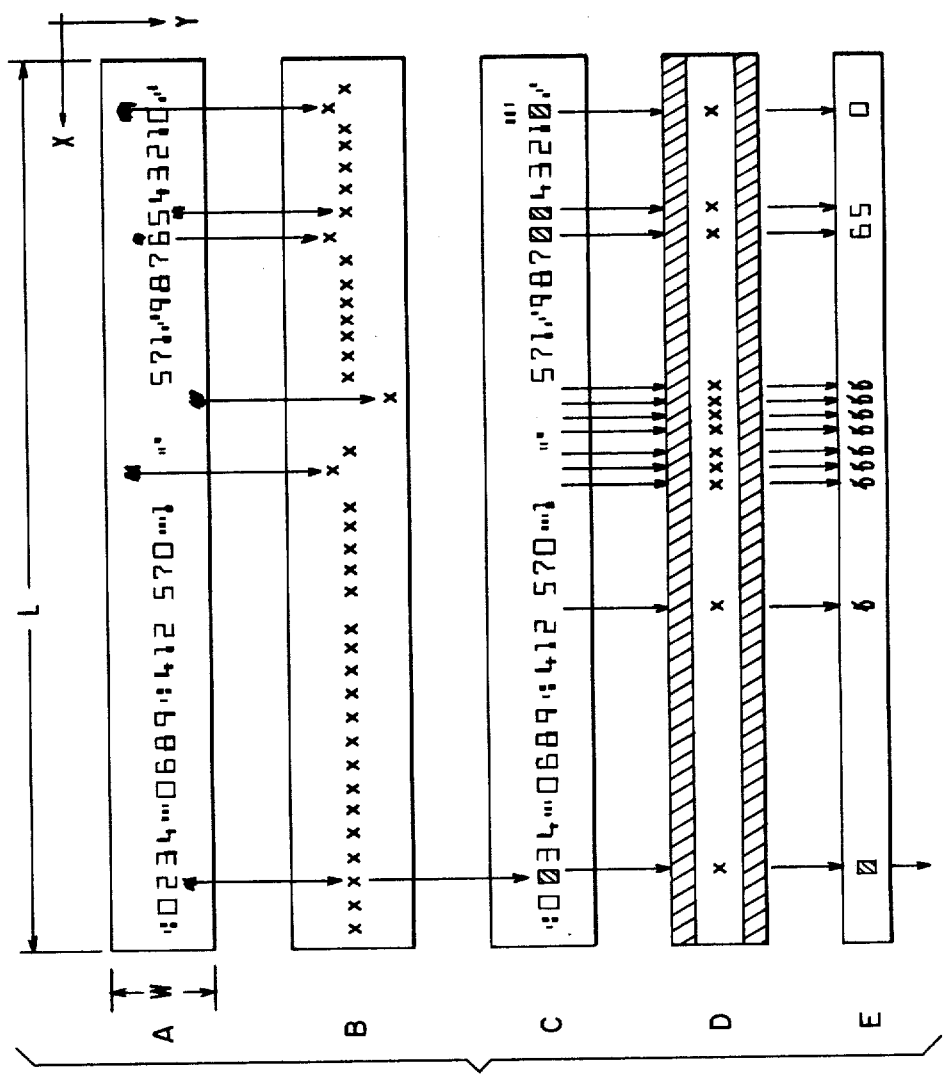
FIG. 5 depicts the results of the steps in the optical character recognition process of the present invention.

FIG. 5 synopsizes the results of the steps of the optical character recognition process. FIG. 5A shows the original MICR scan band having a length L and a width W and which also includes some foreign material. (In the preferred embodiment, the value of L is 8 ¾ inches max, and the value of W is ⅝ inches.) FIG. 5B depicts possible MICR characters as would be located by the character finder algorithm with their X—Y character start coordinates. FIG. 5C shows the characters recognized after Pass 1, each cross-hatched rectangle signifying a character that was not recognized. FIG. 5D depicts the revised MICR band with the predicted X—Y character start positions represented by X symbols for characters not previously found or determined for use in Pass 2. FIG. 5E shows the characters recognized in Pass 2, the symbols being blanks on the document. Handling of any rejected characters remaining after Pass 2, such as the left-most "2" character, can be performed in a number of ways. The operator of the system 10 could input the correct character from the document, or from a screen which would display the particular character. Input/output devices for implementing this approach, and devices for implementing alternative manual input corrective schemes are not shown in System 10 and will not be discussed further herein as such discussion is not necessary for understanding the present invention. FIG. 5A includes the X-Y coordinate system utilized by the system 10.

Figure 6:
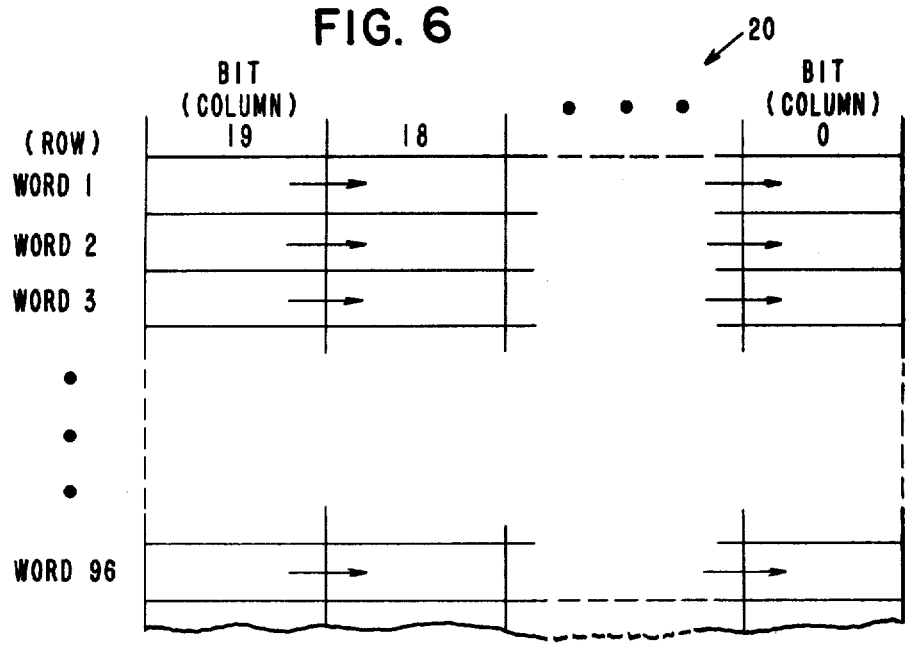
FIG. 6 shows the organization of the working buffer utilized by the character finding algorithm of the present invention.
Figure 7:
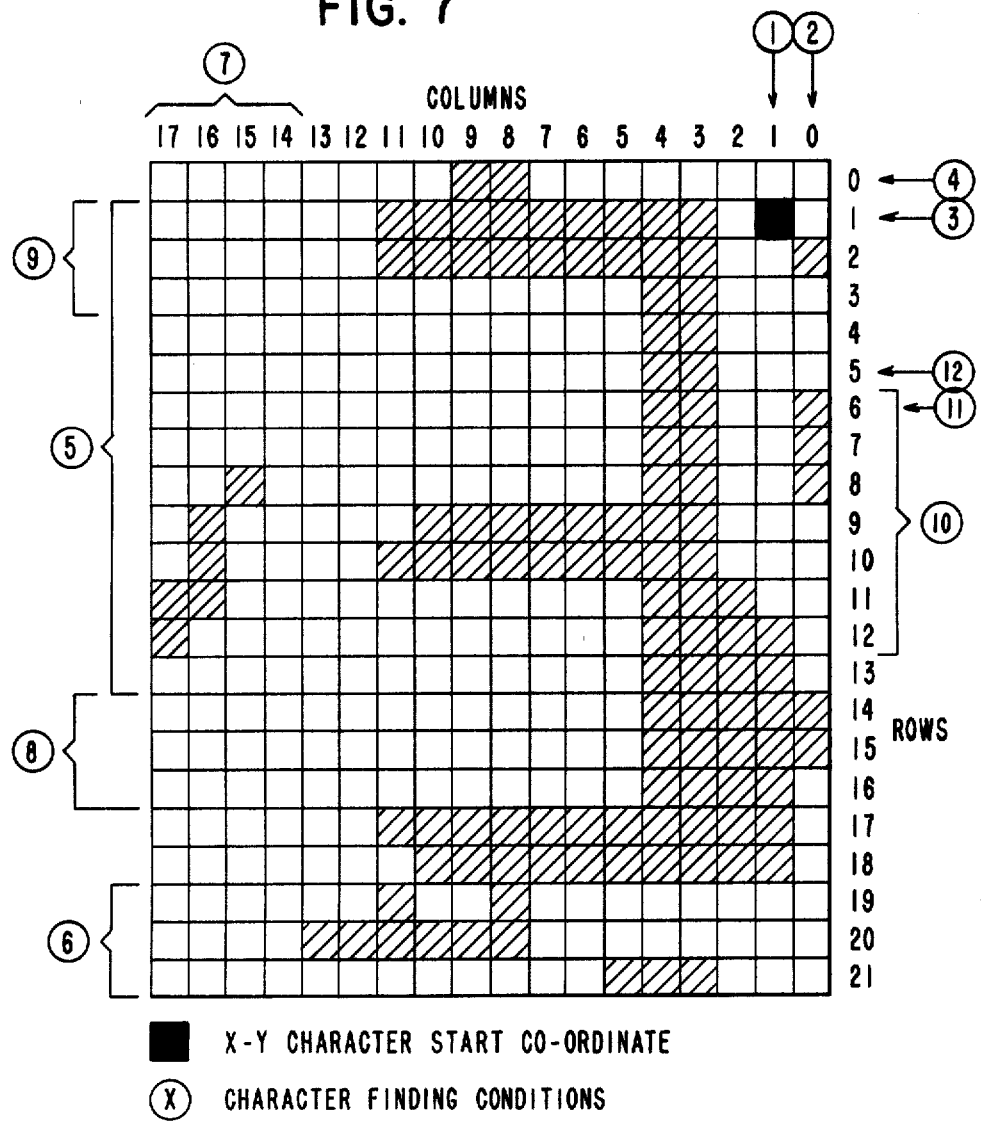
FIG. 7 depicts an 18-bit wide by 22-bit high matrix within the working buffer of the optical character recognition system of the present invention.

The character finding technique used to precisely locate E13B characters will now be described. The working storage memory 20 of the preferred embodiment consists of five 256×4 RAMs organized as a recirculating shift register. The E13B optical scan band data stored in buffer 14 is transferred to working storage memory 20 on a column basis, the working storage memory 20 being organized as a two-dimensional matrix to contain a 96 bit high (corresponding to the height of the optical scan area) by 20 bit wide working buffer. The working buffer is organized as shown in FIG. 6, a little larger than the amount for one character. The working buffer is first filled and then continually updated by column after the character finding algorithm has processed the working buffer. The working buffer is updated by fetching the next column of 96-bit data and storing that data in the bit 19 column of the working buffer, the data already contained therein being shifted such that bits in column 19 shift to columns 18 (i.e. bit 19 word 1 shifts to bit 18 word 1, bit 19 word 2 shifts to bit 18 word 2, . . . and bit 19 word 96 shifts to bit 18 word 96), bits 18 shift to bits 17, etc. The character finder algorithm continually monitors an 18-bit wide by 22-bit high matrix within the working buffer and looks for twelve possible conditions, to determine whether an E13B character has been located. The twelve conditions are delineated in Table 1 below. The character finding conditions related to the 18×22-bit matrix are shown in FIG. 7.

TABLE 1

| Condition Number | Condition Description |
| --- | --- |
| 1 | Column 1 contains at least 5 consecutive blacks |
| 2 | Column 0 doesn't contain at least 5 consecutive blacks |
| 3 | Row 1 contains at least 3 consecutive blacks |
| 4 | Row 0 doesn't contain at least 3 consecutive blacks |
| 5 | Each row 1 through 13 contains at least one black |
| 6 | At least one of rows 19 through 21 doesn't contain 2 or more consecutive blacks |
| 7 | At least one of columns 14 through 17 doesn't contain 2 or more consecutive blacks |
| 8 | At least one of rows 14 through 16 doesn't contain 2 or more consecutive blacks |
| 9 | At least one of rows 1 through 3 doesn't contain 2 or more consecutive blacks |
| 10 | Each row 6 through 12 contains at least one black |
| 11 | Row 6 contains at least 3 consecutive blacks |
| 12 | Row 5 doesn't contain at least 3 consecutive blacks |

Conditions 1 through 7 are used to locate all E13B characters with the exception of the dash symbol. All conditions 1 through 7 have to be true. As shown in FIG. 7, conditions 1 and 2 are fulfilled in columns 1 and 0 and are used to locate the transition of the right edge of the character. Conditions 3 and 4 are fulfilled in rows 1 and 0 and are used to locate the transition to the top edge of the character. Condition 5 determines that the character is not physically broken. Condition 6 locates a white boundary to the bottom of the character. Condition 7 locates a white boundary to the left of the character. This maintains the condition that characters are physically separated.

Conditions 6 through 12 (when all conditions are true) are used to locate the dash symbol. Conditions 8 and 9 locate a white boundary above and below the dash symbol. This prevents false triggering of the dash symbol when strong document backgrounds prevail in the scan band. Condition 10 maintains that the dash symbol is not physically broken. Condition 11 and 12 locates the transition to the top edge of the dash symbol.

As the character finder receives its data, an X-Y co-ordinate generator is updated. The X-Y co-ordinate generator, or position co-ordinate generator is a pair of storage cells which contain an X-coordinate and a Y-coordinate. This X-Y co-ordinate is the character start position of the located character, corresponding to the top right hand corner of this character (intersection of column 1 and row 1 of the character finding matrix).

Figure 8:
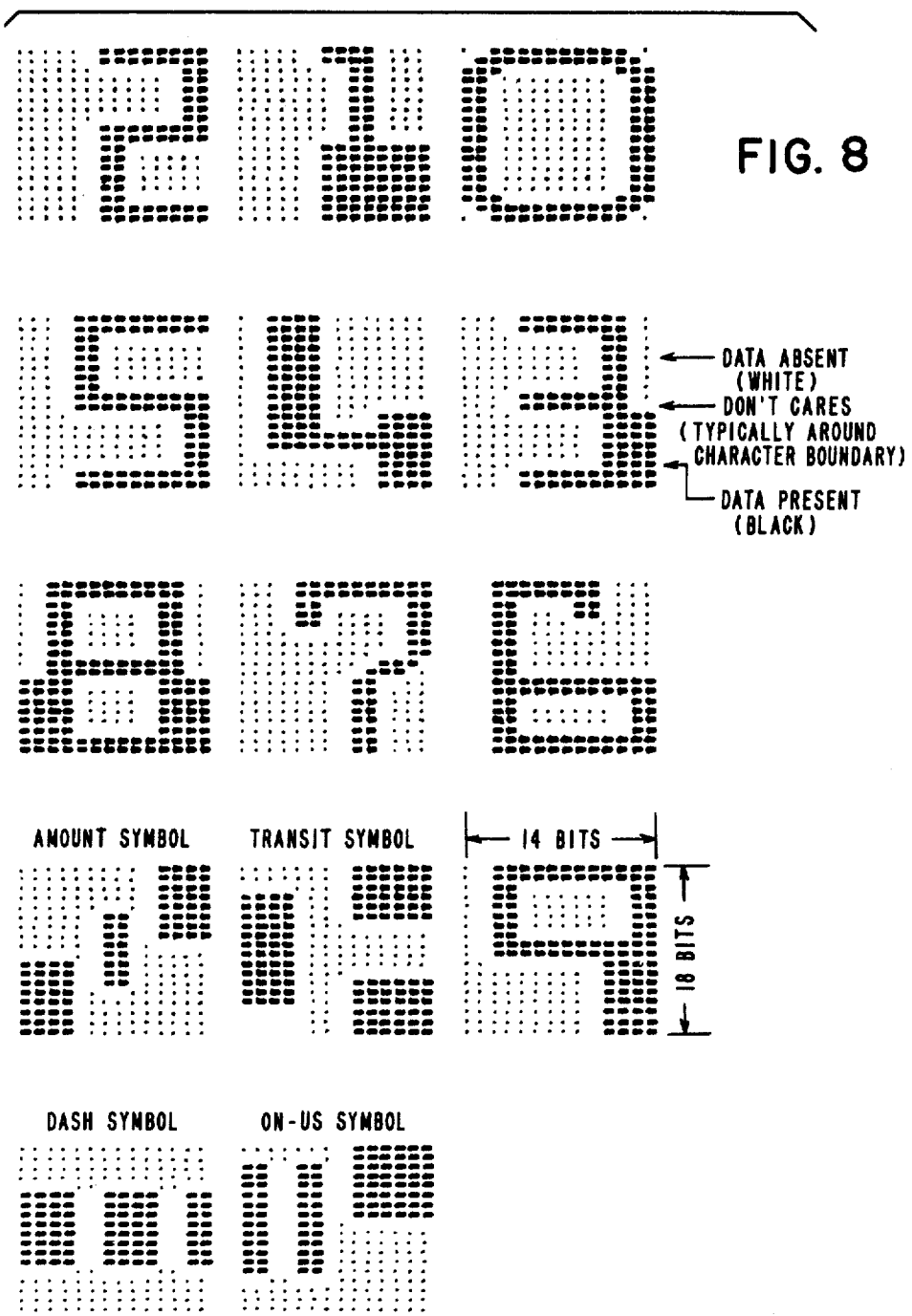
FIG. 8 shows the E13B Font Character Templates of the preferred embodiment of the present invention.

The character recognition algorithm, which will now be described, utilizes a mask (template) matching techniques. Each template consists of black (character areas), white (non-character areas) and don't care elements (ambiguous areas of a character, notably around the character boundaries where a black/white decision is difficult, due to printing and scanning character imperfections). FIG. 8 shows the E13B Font Character Templates (Masks) of the preferred embodiment based on a scanning resolution of 154 pixels per inch.

Figure 9:
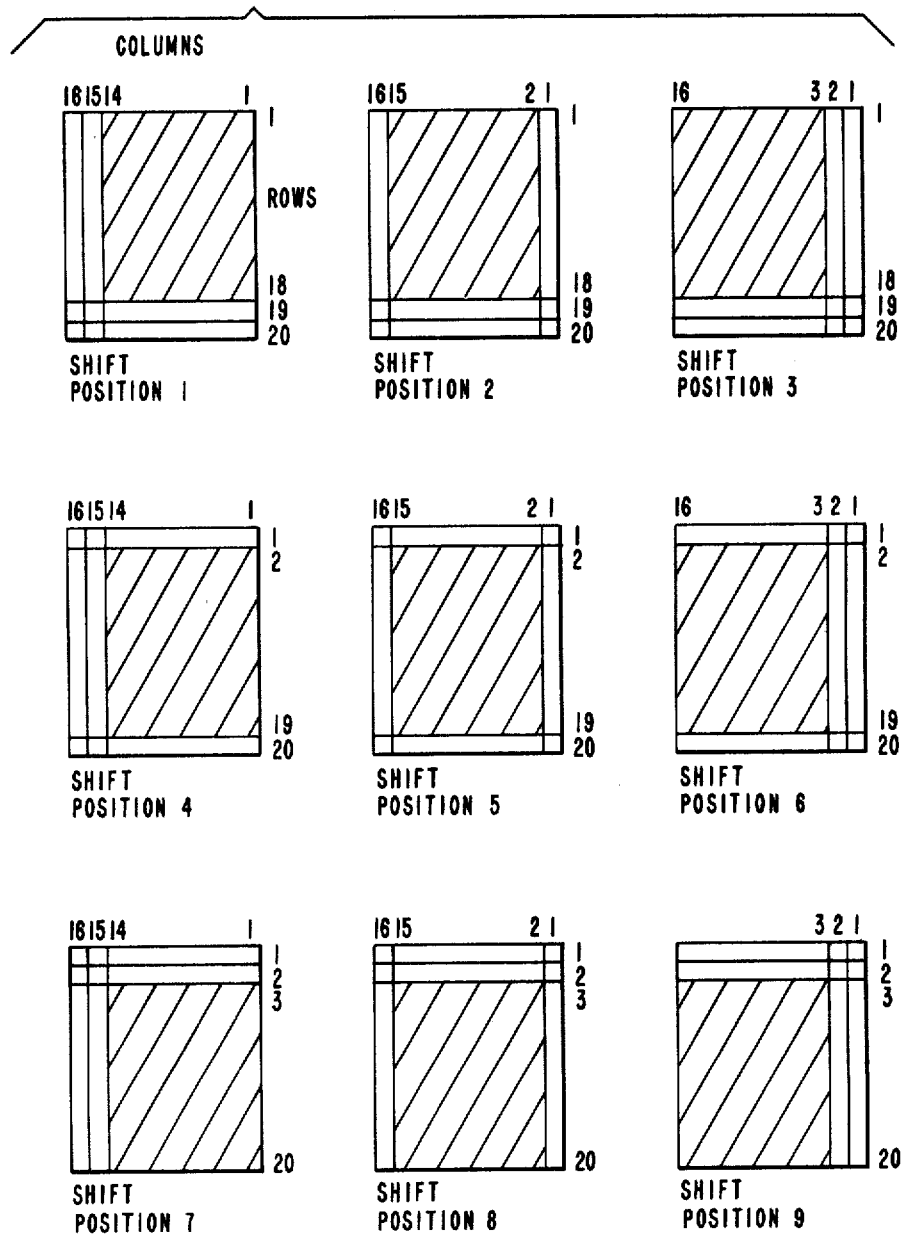
FIG. 9 shows the shift positions utilized in the character recognition process of the present invention.

Each character to be recognized is set up to reside in a data matrix 16 bits wide by 20 bits high. Each of the 14 E13B templates (one per each E13B character) reside in a matrix 28 bits wide by 18 bits high. Each character template (28×18) is actually composed of two subtemplates, each (14×18), such that each subtemplate can be shifted over nine positions as shown in FIG. 9 (3 vertical by 3 horizontal) of the data matrix to obtain a best fit, the shaded portion being the 14×18 bit matrix of the subtemplates. One subtemplate contains the black/white states, the other subtemplate contains the don't care states. For each of the nine shifting positions, the (14×18) don't care state subtemplate is first compared to the data matrix to determine which bits of the data matrix become don't cares. These don't care bits are then ignored and the remaining bits of the data matrix are then compared to the (14×18) black/white state subtemplate to determine the total number of mismatched bits (elements). In addition, for shift positions 2, 5 and 8 the number of black bits which reside in column 1 of the data matrix (the column which is not being compared) are added to the respective total mismatch count of each shift position. For shifting positions 3, 6 and 9, columns 1 and 2 are added to the respective totals. This is done to prevent misreads. Thus each pair of character subtemplates will generate nine totals, each total corresponding to the total number of mismatched points for one shifting position.

The character recognition process will be described by an example, making references to FIG. 10. The fourteen (14) E13B character templates are compared to a potential character, TR is the transmit character, AM is the amount character, ON is the ON US character, and DA is the dash character. For each character template, nine totals are generated, one for each shifting position. Each total is the total number of mismatched elements between the character template and the data matrix, FIG. 10 showing the totals. The minimum of the nine totals is found and stored for each character template, thereby generating 14 numbers. The minimum and next minimum values of the 14 numbers are then determined, the numbers being 2 and 30 as indicated by the arrows in FIG. 10. Finally, if the minimum value is less than a preset value (X1), and the difference between the minimum and next minimum value exceeds a second preset value (X2), then the character which had the minimum value becomes the recognized character.

Thus, in the example

MIN 1 = 2

MIN 2 = 30

In the preferred embodiment the values of X1 and X2 are set at 36 and 8 for Pass 1, and 48 and 9 for Pass 2, respectively. (In Pass 1, since the entire scan band is being processed, the values of X1 nd X2 are set to prevent false recognition and thereby erroneous XY character start coordinates. In Pass 2, the values of X1 and X2 are raised since the scan band search has been considerably narrowed.) Hence, since MIN 1 is less than 48 and MIN 2-MIN 1 is greater than 9, the character is recognized as the "0". If the above criteria are not met then the character is considered a reject.

Although the above process describes an essentially sequential operation, it will be recognized by those skilled in the art that variations may exist within the true scope of the invention. One such variation includes overlapping the optical scanner 12 read and buffer 14 writing with the character finding algorithm processing.

While there has been shown what is considered to be the preferred embodiment of the invention, it will be manifest that many changes and modifications can be made therein without departing from the essential spirit and scope of the invention. It is intended therefore in the annexed claims to cover all such changes and modifications which fall within the true scope of the invention.

We claim:

1. A method for optically reading and determining machine-encoded characters from a printed document, said method comprising the steps of:
   (a) scanning an area of said printed document to generate digitized data;
   (b) storing said digitized data;
   (c) analyzing said digitized data for ascertaining the existence of apparent determinable characters and an associated starting location for each apparent determinable character;
   (d) storing the starting locations in a location table;
   (e) determining on a first pass the machine encoded character for each starting location stored in the location table;
   (f) editing the location table for predicting the probable starting locations of additional characters, including blanks; and
   (g) determining on a second pass additional characters and blanks based upon the predicted probable starting locations of additional characters and blanks.

2. A method for optically reading and determining machine-encoded characters according to claim 1 wherein said analyzing step comprises the steps of:
   (a) initializing a position coordinate generator;
   (b) monitoring a portion of the digitized data, the portion being a two-dimensional matrix based upon information contained within the position coordinate generator, to ascertain whether a predetermined set of conditions is satisfied;
   (c) recording the information contained within the position coordinate generator in the location table if the predetermined set of conditions is satisfied;
   (d) updating the position coordinate generator; and
   (e) repeating the monitoring, recording, and updating steps until all the digitized data has been monitored.

3. A method for optically reading and determining machine-encoded characters according to claim 2, wherein the step of determining comprises the steps of:
   (a) setting up the digitized data of a character in a working matrix, said working matrix having storage capacity which corresponds to an area which is wider and higher than an area allocated for the character;
   (b) comparing a portion of the working matrix to a first prestored template of the character in order to determine elements of the digitized data within the portion of the working matrix in which it is immaterial whether the digitized data is a 0 or a 1 to separate the digitized data from such elements from the digitized data from elements which are of interest;
   (c) comparing the digitized data of interest to a corresponding black-white prestored template of the character to determine the number of mismatched data elements;
   (d) storing the number of mismatched elements;
   (e) readying a next portion of the working matrix to be compared;
   (f) repeating steps (b) through (e) until the total area of the working matrix is covered;
   (g) repeating steps (b) through (f) until all the prestored templates of the characters have been utilized; and
   (h) determining the character by analyzing the number of mismatches stored in step (d).

4. A method for optically reading and determining machine encoded characters, according to claim 3, further comprising the step of:
   outputting the determined character in a machine readable form.

5. A method of optically reading and determining machine-encoded characters printed at substantially predetermined locations on a printed document, said method comprising the steps of:
   (a) scanning an area of the printed document to generate digitized data corresponding to incremental areas of the document;
   (b) storing the digitized data;
   (c) analyzing the digitized data on a first pass to ascertain the existence of apparent machine-encoded characters and coordinates of an apparent starting location associated with each apparent character;
   (d) storing the coordinates of the apparent starting locations in a location table;
   (e) comparing the digitized data for each of the apparent starting locations with character-template data to make an initial determination of the identity of any machine-encoded character that might be associated with each of the starting locations;
   (f) editing the location table:
      (i) to delete apparent starting locations inconsistent to a predetermined extent with the majority of apparent starting locations,
      (ii) to predict additional probable starting locations substantially uniformly spaced from the previously determined majority of apparent starting locations, and
      (iii) to retain the apparent starting locations that are sufficiently consistent with the majority of apparent starting locations and are associated with data apparently representing encoded characters that were not identified on the first pass; and (g) comparing, on a second pass, the data associated with the additional probable starting locations and any of the retained locations to identify blanks and characters not identified on the first pass.

6. The method of claim 5 in which the template data represents a set of incremental areas which are associated with a given character and in which the digitized data should be definitely a 1 or a 0 to identify the given character, the digitized data associated with each starting location being compared with the template data to determine whether there is a sufficiently close match between that digitized data and the template data to identify the given character.

7. The method of claim 6 in which the closeness of the match is determined by the steps of:
    (a) comparing with the digitized data corresponding to incremental areas which are associated with a given one of the starting locations and which cover a sufficient total area to define one of the characters, the template data for a given character to produce, corresponding to each of the incremental areas, a comparison signal that has a first value when the digitized data is discrepant from the template data for the same incremental area;
    (b) summing the discrepant comparison signals;
    (c) repeating the comparing and summing steps for template data for other characters and the digitized data for that total area to obtain a set of sums of discrepant comparison signals;
    (d) comparing the sums of the discrepant comparison signals to determine which of such sums has the lowest value; and
    (e) determining whether the value of the lowest-valued sum is below a predetermined value, the data in that total area being identified as the character corresponding to the template data that results in said lowest value sum if such sum is below the predetermined value.

8. The method of claim 7 comprising the additional steps of:
    (a) determining which of such sums has the second-lowest value; and
    (b) determining whether the value of the second-lowest sum is above a second predetermined value higher than the first-named predetermined value.

9. The method of claim 7 comprising the additional steps of:
    (a) repeating the step of comparing, with the template data, the digitized data that represent a second area of the same size and shape as the total area and overlapping a substantial part of the total area but offset therefrom in a first direction to obtain a second set of sums of discrepant comparison signals; and
    (b) comparing all of the sums of the first-named set and the second set to determine which sum has a value below the predetermined value, the last-named sum identifying the data in the first-named area or the offset area as representing the character corresponding to the template data that resulted in that sum.

10. The method of claim 7 comprising the additional steps of:
    (a) repeating the step of comparing, with the template data, the digitized data that represent eight additional areas of the same size and shape as the total area but offset therefrom into regions bordering all sides of the total area, the amount of offset in each direction being not more than the dimension of one of the incremental areas in that direction, to obtain a total of nine sets of sums of discrepant comparison signals for nine overlapping areas;
    (b) comparing all of the sets of sums to determine which sum is the lowest valued sum and which sum is the second-lowest valued sum;
    (c) comparing the lowest valued sum with a first predetermined value to determine whether the lowest valued sum is qualified as a character-identifying sum; and
    (d) comparing the second-lowest valued sum with a second predetermined value higher than the first predetermined value to confirm that the lowest valued sum identifies the data in the corresponding overlapping areas as representing the character corresponding to the template data that resulted in the lowest valued sum.

11. The method of claim 5 in which the template data includes a first set of template data representing a first set of incremental areas which are associated with a given character and in which it is immaterial whether digitized data is a 1 or a 0 and a second set of template data representing a second set of incremental areas which are associated with the same character and in which the digitized data should be definitely a 1 or a 0 to identify the given character, the step of comparing comprising:
    (a) first comparing the digitized data associated with each starting location with the first set of template data to identify the data associated with the first set of incremental areas; and
    (b) then comparing the same digitized data with the second set of template data to determine whether there is a sufficiently close match between that digitized data and the second set of template data to identify the given character.

12. The method of claim 11 comprising the step of deleting the digitized data for each of the incremental areas in which it is immaterial, based on the first set of template data, whether the digitized data is a 1 or a 0 before comparing the remaining digitized data with the second set of template data corresponding to the same character.

13. The method of claim 12 in which the first and second sets of template data correspond to the same character of a predetermined set of characters and in which the digitized data compared with the first and second sets of template data corresponds to a total area sufficient to define any one of the characters, said method comprising the further steps of:
    (a) recording a sum corresponding to the number of incremental areas which are in the total area and in which the remaining digitized data is discrepant from the second set of template data;
    (b) repeating the recording step for the template data corresponding to each of the other characters of the predetermined set to obtain a set of sums corresponding to all of the characters in the predetermined set; and
    (c) comparing all of the sums to determine the lowest valued sum corresponding to that total area to identify the digitized data in that total area as corresponding to the second set of template data that resulted in the lowest valued sum.

14. The method of claim 13 in which the steps of comparing and recording the sum are repeated for the first and second sets of template data corresponding to one of the characters for each of a plurality of overlapping areas, each of which is the same size and shape as the total area and substantially overlaps the total area and is offset by not more than the dimension of two of the incremental areas in any direction from any other of the overlapping areas to form a first subset of discrepant comparison signals;

(a) subsequently repeating the comparing and recording steps for the first and second sets of data for the total area and for the same set of areas overlapping therewith to form a plurality of additional subsets of discrepant comparison signals;
  (b) determining the lowest valued sum of discrepant signals in each of the subsets;
  (c) determining which of the lowest valued discrepant sums from all of the subsets has the minimum value and which sum has the second lowest value;
  (d) comparing the minimum value sum with a first predetermined value; and
  (e) comparing the second-lowest valued sum with a second predetermined value larger than the first predetermined value to determine that the digitized data in one of the overlapping areas corresponds to the character for which the template data produces the minimum valued sum having a value less than the first predetermined value, provided the second-lowest value sum from all of the subsets has a value higher than the second predetermined value.

* * * * *